Nov. 19, 1968     E. WATSON     3,412,352
MAGNET ASSEMBLIES FOR PRODUCING HIGHLY HOMOGENEOUS
MAGNETIC FIELDS
Filed April 19, 1965

INVENTOR
EDWARD WATSON
BY
Irwin S. Thompson
ATTORNEY

# United States Patent Office 3,412,352
Patented Nov. 19, 1968

3,412,352
MAGNET ASSEMBLIES FOR PRODUCING HIGHLY HOMOGENEOUS MAGNETIC FIELDS
Edward Watson, Hampton, England, assignor to Newport Instruments Limited, Newport Pagnell, Buckinghamshire, England, a British company
Filed Apr. 19, 1965, Ser. No. 449,243
Claims priority, application Great Britain, Apr. 22, 1964, 16,741/64
5 Claims. (Cl. 335—298)

This invention relates to magnet structures or assemblies and is particularly concerned with arrangements for providing a magnetic field of extremely high homogeneity as is required, for example, in conducting experiments on and observations of gyromagnetic resonance.

Gyromagnetic resonance experiments are conducted in a magnetic field including a field component of unidirectional character, and since the frequency at which resonance occurs is a function of the applied magnetic field strength it follows that if the magnetic flux is not homogeneous the resultant resonance will be spread over a range of frequencies, and this is disadvantageous. Furthermore, the intensity of the resonance effect is proportional to the second power of the magnetic field strength and due to the presence of electrical noise in any given detecting circuit strong signals are available at low magnetic field strength values only when large volumes of homogeneous magnetic field are employed.

It is a common feature of conventional magnet designs for gyromagnetic resonance experiment purposes that the working space, or volume of homogeneous magnetic field, has been limited to the order of 5 cc. at the maximum, due to the effect of stray magnetic fields produced by the magnets. In one such known magnet assembly two parallel soft iron slabs are each provided with a projecting soft iron pole piece, the opposing faces of the pole pieces defining between them a small air gap in which resonance experiments can be conducted. A magnetic field is induced in the gap by means of permanent magnets disposed between the slabs at positions remote from the pole pieces, these permanent magnets each being provided with a magnetic shunt to reduce the stray flux in the air gap and hence to improve the homogeneity of the magnetic field in the gap. However, in such an arrangement barrel distortion still affects the magnetic field in the gap and is due to the finite value of the pole diameter to gap width ratio. This ratio is therefore kept as large as possible but the maximum size of pole diameter is limited by magnet design, space requirements, and expense, so that the provision of a large volume air gap has previously been impracticable.

It is therefore an object of the present invention to provide a simplified and improved design of magnet structure which will provide a greatly increased useful volume of homogeneous magnetic field. For example, volumes of between 100 cc. and 1000 cc. can be provided while still utilising a magnet of small physical dimensions. The design furthermore permits of further enlargement of the homogeneous field volume to a substantially unlimited extent.

A magnet structure in accordance with the present invention comprises two pole pieces of magnetic material of low retentivity having plane pole faces held in opposing, substantially parallel, spaced relationship by means of magnetic flux-providing means located between said pole faces on two opposed sides of the air gap between said pole faces, said magnetic flux-providing means comprising either permanent magnet means or electromagnet core means and being poled so as to render the opposed pole pieces of opposite polarity, whereby a magnetic field of high homogeneity is provided in said air gap.

Such an arrangement makes use of the pin-cushion distortion present in the stray field of the free poles of the spacing elements to balance the barrel distortion arising from the finite value of the pole face dimension to gap width ratio. Due to the largely self-cancelling effects of the pin-cushion and barrel distortion of the magnetic flux lines arising around the flux-providing elements and between the pole pieces respectively, the enclosed volume of the air gap contains a magnetic field of extremely high homogeneity.

It is important, however, to appreciate that in the present invention the internal reluctance of the magnetic flux-providing means must not be zero, and also the reluctance of the flux-providing means must be large compared with the reluctance of the pole pieces. The actual dimensional design of any magnet structure according to the invention is complex and can best be achieved by the use of an electrolytic tank model as an analogue. Although there is an optimum set of dimensions for any magnet structure dependent on the materials used, it is preferable that the gap between the pole faces should be not greater than half the smallest dimension of the pole face.

In order that the invention may be more readily understood, two embodiments thereof will now be described in detail by way of example and with reference to the accompanying drawings, in which.

Figure 3:
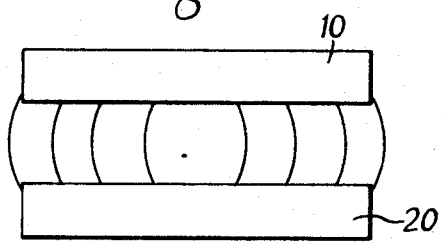
FIG. 3, is a schematic representation of barrel distortion of the magnet field normally induced between spaced plane surfaces of two magnetised pole pieces.
Figure 4:
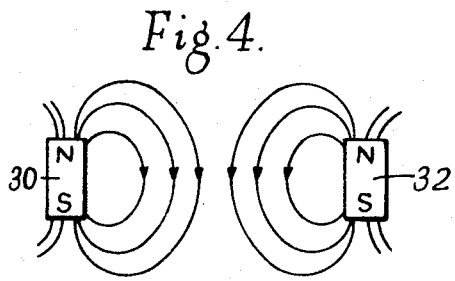
FIG. 4 is a schematic representation of the magnetic field set up by the spacing elements of the magnet structure of FIG. 1.

Referring first to FIGS. 1 to 4, the magnet assembly shown therein comprises a first rectangular and relatively thick slab 10 of soft iron or other material of high permeability having a first pair of parallel sides 12, 14 and a second pair of parallel sides 16, 18 held in spaced, essentially parallel relationship from a second similar slab 20 of the same material having a first pair of parallel sides 22, 24 and a second pair of parallel sides 26, 28 by means of two rectangular cross-section blocks 30 and 32 of permanent magnetic material which are disposed in parallel in contact with the slabs. The slabs 10 and 20 act as pole pieces in the magnet assembly and their opposing plane faces 34 and 36 respectively serve as the two pole faces on opposite sides of an air gap formed therebetween. The reluctance of the permanent magnets 30, 32 is arranged to be large compared with the reluctance of the pole pieces 10, 20, and the gap width, i.e. the spacing between the pole faces 34, 36, is preferably less than half the smaller dimension of the pole faces 34, 36. The sides of the air gap are defined by the inward facing sides 38 and 40 of the two permanent magnet blocks 30 and 32 respectively. The two permanent magnet blocks 30 and 32 extend almost to the edges of the sides 12, 14 and 22, 24 and are located close to the edges of the sides 16, 26 and 18, 28 of the pole pieces. The permanent magnet blocks 30, 32 have their magnetism so poled that one slab, say slab 10, is in contact with the N-pole end of each permanent magnet block and the other slab 20 is in contact with the S-pole end of each permanent magnet block. As shown in FIGS. 3 and 4, the barrel distortion of the magnetic flux lines between the two opposing planar pole faces of the slabs 10, 20 combines with the pin-cushion distortion of the magnetic flux lines between the two parallel spaced permanent magnet blocks 30, 32 to largely cancel out and thereby provide a homogeneous and undistorted magnetic field within the central region between the opposing planar pole faces 34, 36 of the two slabs 10, 20.

Such a magnet structure which provides a highly homogeneous magnetic field in the gap is of particular use for gyromagnetic and other experiments on the flow of material in a pipline passing through such a magnetic field. Such a pipeline is indicated at 42 in FIGS. 1 and 2 and has associated therewith a radio-frequency test coil 44 having leads 46, 48. The magnet structure need not of course be used only with flowing materials and is equally well adapted for use with static samples.

The homegeneity of the magnetic field between the slabs 10, 20 can be optimised by varying the gap width, i.e. the distance between the planar pole faces 34, 36, while keeping the distance between the permanent magnet blocks 30, 32 constant. This may be effected in any suitable desired manner such as by means of adjusting screws 50 arranged to pass through the upper slab 10 and be received in the upper face of the lower slab 20 on the sides of the permanent magnets remote from the gap. Shims of magnetically soft material of chosen reluctance can then be inserted to control the pin-cushion field.

Alternatively, to optimise the homogeneity of the field, the gap width can be held constant and the permanent magnets 30, 32 moved together towards the centre of the gap. This increases the pin-cushion effect with the magnets close together and decreases the effect when they are spaced further apart.

Figure 5:
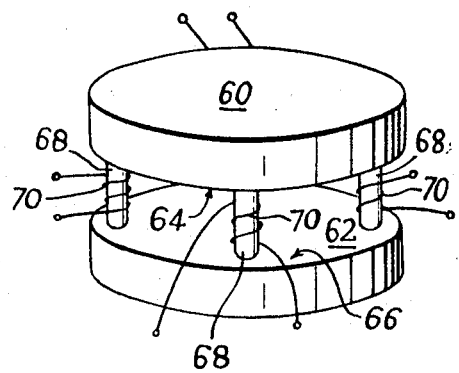
FIG. 5 is a persceptive view of a second embodiment of magnet structure according to the invention with two circular pole pieces.

In one alternative construction as shown in FIG. 5, two circular slabs 60, 62 of soft iron are employed. The two slabs present opposing upper and lower planar pole faces 64 and 66 respectively and are held in spaced relationship by a plurality, four in FIG. 5, of electromagnet cores 68 each provided with an energising winding 70. These cores are disposed around the periphery of the circular slabs 60, 62 and are equi-spaced from one another. As in the first embodiment, the reluctance of the cores 68 is arranged to be large compared with the reluctance of the pole pieces 60, 62, and the gap width is preferably less than half the diameter of the pole faces 64, 66. In this manner, when the cores are energised, the same self-cancelling distortion effects are produced as mentioned in connection with the first embodiment and a highly homogeneous magnetic field is produced in the gap between the pole faces 64, 66. As in the first embodiment, means for varying the separation of the pole faces may be provided, such as in the form of three equi-spaced adjusting screws passing through the upper slab 60 and received in the lower slab 62 alternatively, the separation may be varied by moving the cores radially inwards towards the centre of the gap. The electromagnet cores 68 may be energised in any suitable manner including by means of circuits of superconducting material.

Figure 1:
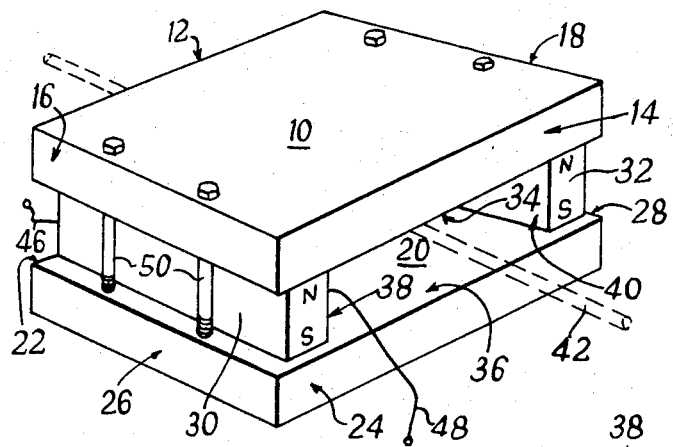
FIG. 1 is a perspective view of a magnet structure according to the present invention with two rectangular pole pieces and two magnetic flux-providing space elements.
Figure 2:
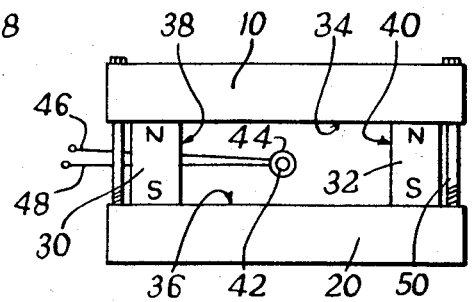
FIG. 2 is an end view of the magnet structure of FIG. 1.

Although the FIG. 1 embodiment has been illustrated with permanent magnets and the FIG. 5 embodiment with electromagnets, these can be interchanged if required and as governed by particular working circumstances. Moreover the number of such spacing elements may be varied as required and the materials used may be of any suitable type. Since some inhomogeneity can be caused by using material which is itself not homogeneous with respect to permeability for a given magnetizing force, magnetically very soft and well annealed material is required.

In each of the embodiment illustrated a plurality of magnetic spacer elements have been used. However, the present invention also envisages the use of a single annular piece of permanent magnet material provided with holes therein to accommodate the pipeline or like member conveying the sample being tested and the lead wires to the test coil.

If it is required to superimpose a scanning field on the main magnetic field this can be effected by the use of coils wound exactly over the permanent magnets, or electromagnets, or superconducting magnets, as the case may be. This simply increases or decreases the field without varying the space distribution pattern.

I claim:
1. A magnet assembly comprising two pole pieces of magnetically soft material each having a continuous plane pole face, said pole pieces being arranged such that said pole faces are disposed in direct face-to-face relationship in spaced substantially parallel planes and having two axes of symmetry extending at right-angles to one another parallel to said planes containing the pole faces, and magnetic flux-providing means arranged between said pole faces and symmetrically with respect to said axes to define with said pole faces the boundaries of an air gap between said pole pieces, said flux-providing means being discontinuous at two oppositely disposed locations through which one of the said axes extends and being poled so as to render the opposed pole pieces of opposite polarity, and said pole pieces being of a thickness in a direction perpendicular to said planes such that the reluctance of the pole pieces is small compared with the reluctance of the magnetic path through said flux-providing means, whereby a magnetic field of high homogeneity is produced within said air gap in the directions of both said axes.

2. A magnetic assembly as claimed in claim 1, in which said flux-providing means comprises permanent magnets located on two opposed sides of said air gap, said magnets being positionally adjustable with respect to each other along the other of said axes to vary the area of homogeneity of the magnetic field.

3. A magnet assembly as claimed in claim 1, in which the thickness of said air gap in said direction perpendicular to said planes is not greater than half the smallest dimension of said pole faces.

4. A magnet assembly as claimed in claim 1, in which said pole faces are circular and in which said flux-providing means comprises a plurality of elements equi-spaced from one another on a circle within the periphery of and concentric with said pole faces, at least two such elements being disposed on each side of said one axis.

5. A magnet assembly as claimed in claim 4, in which said elements are electromagnet cores.

References Cited

UNITED STATES PATENTS 2,797,360 6/1957 Rogers et al. _____ 317—201
3,030,556 4/1962 Watson _____ 317—158

GEORGE HARRIS, *Primary Examiner.*